(12) United States Patent
Aymes et al.

(10) Patent No.: US 9,065,530 B2
(45) Date of Patent: Jun. 23, 2015

(54) CALIBRATION METHOD AND SYSTEM FOR ESTIMATING A PATH DIFFERENCE OF A TARGET SIGNAL TRANSMITTED BY A SPACECRAFT OR AIRCRAFT

(71) Applicant: ASTRIUM SAS, Suresnes (FR)

(72) Inventors: Jean-Marc Aymes, Saint Orens de Gameville (FR); Raphael Sanchez, Balma (FR); Frederic Voulouzan, Toulouse (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 0 days.

(21) Appl. No.: 14/366,633

(22) PCT Filed: Dec. 21, 2012

(86) PCT No.: PCT/EP2012/076683
§ 371 (c)(1),
(2) Date: Jul. 5, 2014

(87) PCT Pub. No.: WO2013/093021
PCT Pub. Date: Jun. 27, 2013

(65) Prior Publication Data
US 2014/0362896 A1    Dec. 11, 2014

(30) Foreign Application Priority Data

Dec. 22, 2011 (FR) ...................................... 11 04013

(51) Int. Cl.
H04B 7/10      (2006.01)
H04L 1/02      (2006.01)
H04B 7/185     (2006.01)
H04B 17/21     (2015.01)
H04B 17/27     (2015.01)
H04B 17/309    (2015.01)
H04B 7/08      (2006.01)

(52) U.S. Cl.
CPC .............. *H04B 7/18519* (2013.01); *H04B 7/08* (2013.01); *H04B 17/21* (2015.01); *H04B 17/27* (2015.01); *H04B 17/309* (2015.01)

(58) Field of Classification Search
USPC ......... 375/130–153, 239, 256–285, 295–352, 375/354–377
See application file for complete search history.

(56) References Cited

U.S. PATENT DOCUMENTS 5,359,331 A * 10/1994 Adler ............................ 342/124
6,005,514 A * 12/1999 Lightsey ....................... 342/365
(Continued)

OTHER PUBLICATIONS

Aghvami et al., "Adaptive Antennas: The Calibration Problem," IEEE Communications Magazine, Dec. 1, 2004, pp. 114-122, vol. 42, No. 12, IEEE Service Center, Piscataway, US.

*Primary Examiner* — Sam K Ahn
*Assistant Examiner* — James M Perez
(74) *Attorney, Agent, or Firm* — Im IP Law PLLC; C. Andrew Im

(57) ABSTRACT

A method and system for estimating a path difference between two paths followed by a target signal transmitted by a spacecraft or aircraft to a first receiving antenna and a second receiving antenna of a receiving base, respectively. A useful-phase difference is measured between signals corresponding to the target signal received on the first receiving antenna and second receiving antenna. The path difference is estimated on the basis of the measurements of the useful-phase difference. A calibration signal is transmitted to the receiving base and a calibration phase difference between signals corresponding to the calibration signal received on the first receiving antenna and second receiving antenna is measured. Variations are compensated in the measurements of the calibration-phase difference relative to the measurements of the useful-phase difference.

13 Claims, 3 Drawing Sheets

(56) References Cited

U.S. PATENT DOCUMENTS

H2224 H * 10/2008 Madden ................. 342/424
2008/0107155 A1 * 5/2008 Kennedy et al. ............ 375/133
2009/0278733 A1 * 11/2009 Haworth ................ 342/357.01
2010/0150013 A1 * 6/2010 Hara et al. .................. 370/252
2010/0289687 A1 * 11/2010 Vander Velde et al. ......... 342/16
2011/0205130 A1 * 8/2011 Mrstik ...................... 343/703

* cited by examiner

CALIBRATION METHOD AND SYSTEM FOR ESTIMATING A PATH DIFFERENCE OF A TARGET SIGNAL TRANSMITTED BY A SPACECRAFT OR AIRCRAFT

RELATED APPLICATIONS

This application is a §371 application from PCT/EP2012/076683 filed Dec. 21, 2012, which claims priority from French Patent Application No. 11 04013 filed Dec. 22, 2011, each of which is herein incorporated by reference in its entirety.

TECHNICAL FIELD

The present invention belongs to the field of spacecraft or aircraft observation, and relates more particularly to a system and method for estimating a path-length difference between two paths followed by a signal transmitted by said craft, referred to as "target signal", to arrive respectively on a first receiving antenna of a receiving base and a second receiving antenna of said receiving base.

The present invention is applicable particularly advantageously, although in a nonlimiting manner, for satellite orbit recovery, notably for satellites in geostationary orbit (GEO).

STATE OF THE ART

FIG. 1 represents a known system 10 for restoring the orbit of a satellite 20 in GEO orbit.

The known orbit recovery system 10 comprises a receiving base formed by a first receiving antenna 12a and a second receiving antenna 12b. The satellite 20 transmits a target signal to the earth, and this target signal is received by each of the first and second receiving antennas 12a, 12b of the receiving base.

The orbit of the satellite 20 is recovered for example, notably from an estimation of a path-length difference between the two paths followed by said target signal to arrive respectively on the first receiving antenna 12a and the second receiving antenna 12b of the receiving base.

The path-length difference, designated "dm" in FIG. 1, is estimated as a function of a phase difference between signals corresponding to the target signal received respectively on the first receiving antenna 12a and the second receiving antenna 12b.

The path-length difference dm is, for example, used to estimate a direction of arrival, designated "θ" in FIG. 1, of the target signal relative to the receiving base, generally by assuming that said direction of arrival 8 is the same on each of the first and second receiving antennas 12a, 12b (this approximation being valid provided that the distance between the receiving base and the satellite 20 is very much greater than the distance, designated "db" in FIG. 1, between the first receiving antenna 12a and the second receiving antenna 12b). According to another example, the path-length difference dm is used directly in a model of the trajectory of the satellite 20 to directly recover the orbit of said satellite, by possibly taking into account other measurements and/or information.

A processing device 14 performs the processing operations of said signals received on the first and second receiving antennas 12a, 12b. The processing device 14 is linked to each of the first and second receiving antennas by, respectively, a first receiving chain 16a and a second receiving chain 16b.

Generally, the greater the distance db between the first and second receiving antennas 12a, 12b of the receiving base, the more accurate the estimation of the path-length difference dm. In the known GEO orbit recovery systems 10, the distance db is of the order of a few hundred meters.

However, the accuracy of the estimation of the path-length difference depends greatly on the accuracy of the phase difference measurements, which depends on the signal to noise/interference ratio of the target signal received by the first and second receiving antennas 12a, 12b. Thus, if this signal to noise/interference ratio is low, the accuracy of the estimation will be low and all the more sensitive to the phase stability of the first and second receiving chains 16a, 16b. In practice, the variations of the measured phase difference comprise both variations induced by the variations of the path-length difference dm, and variations linked to the phase instabilities of the first and second receiving chains 16a, 16b.

To improve the signal to noise/interference ratio, the first and second receiving antennas 12a, 12b are highly directional in order to exhibit very significant respective antenna gains. To reduce the variations linked to the phase instabilities of the first and second receiving chains 16a, 16b, the elements forming said first and second receiving chains must themselves be very stable, and are generally hardened.

Such a known GEO orbit recovery system 10, in order to obtain good performance levels, proves complex and costly to manufacture.

Furthermore, the known GEO orbit recovery system 10 involves a transportation of the radio frequency signal (on carrier frequency or on intermediate frequency) to the processing device 14 which performs the digitization. This also poses significant cost and civil engineering problems on the site hosting the estimation system (acceptable curvature radii of the cables, attenuations, etc.).

SUMMARY OF THE INVENTION

The aim of the present invention is to remedy all or some of the limitations of the prior art's solutions, notably those explained above.

To this end, and according to a first aspect, the present invention relates to a method for estimating a direction of arrival or a path-length difference of a signal transmitted by a spacecraft or aircraft, referred to as "target signal", relative to a receiving base comprising a first receiving antenna and a second receiving antenna, said method comprising a step of measuring a phase difference, referred to as "useful phase difference", between signals corresponding to the target signal received respectively on the first receiving antenna and the second receiving antenna, and a step for estimating the direction of arrival or the path-length difference as a function of useful phase difference measurements. Said method also comprises the steps of:

- transmitting a signal, referred to as "calibration signal", to the receiving base, by means of a transmitting antenna,
- measuring a phase difference, referred to as "calibration phase difference", between signals corresponding to the calibration signal received respectively on the first receiving antenna and the second receiving antenna,
- compensating variations of the calibration phase difference measurements on the useful phase difference measurements.

According to particular implementations, the method comprises one or more of the following features, taken in isolation or in all technically possible combinations.

In a particular implementation, the step of measuring calibration phase difference comprises either the correlation of the signals received respectively on the first receiving antenna and the second receiving antenna with the transmitted calibration signal, or the analysis of said signals received respectively on the first receiving antenna and the second receiving antenna by means of an FFT or of a PLL.

In a particular implementation, the calibration signal and the target signal are transmitted in at least partially overlapping respective frequency bands.

In a particular implementation, the calibration signal is transmitted at the same time as the target signal. In a particular implementation, the calibration signal is transmitted continuously.

In a particular implementation, the calibration signal is a substantially sinusoidal signal or a signal of the type with spectrum spread by a spectrum spreading code.

In a particular implementation, the signals received respectively on the first receiving antenna and the second receiving antenna are digitized by asynchronous analog/digital converters, transmitted to a processing device via a communication network, and resynchronized by said processing device by correlation with the transmitted calibration signal.

According to a second aspect, the present invention relates to a system for estimating a direction of arrival or a path-length difference of a signal transmitted by a spacecraft or aircraft, referred to as "target signal" in relation to a receiving base of said system comprising a first receiving antenna and a second receiving antenna, said system also comprising means suitable for measuring a phase difference, referred to as "useful phase difference", between signals corresponding to the target signal received respectively on the first receiving antenna and the second receiving antenna, and means suitable for estimating the path-length difference as a function of useful phase difference measurements. Said system comprises:
 a transmitter suitable for transmitting a signal, referred to as "calibration signal", to the receiving base, by means of a transmitting antenna,
 means suitable for measuring a phase difference, referred to as "calibration phase difference", between signals corresponding to the calibration signal received respectively on the first receiving antenna and the second receiving antenna,
 means suitable for compensating variations of the calibration phase difference measurements on the useful phase difference measurements.

According to particular embodiments, the system comprises one or more of the following features, taken in isolation or in all technically possible combinations.

In a particular embodiment, the means suitable for measuring the calibration phase difference are configured to perform either a correlation of the signals received respectively on the first receiving antenna and the second receiving antenna with the transmitted calibration signal, or an analysis of said signals received respectively on the first receiving antenna and the second receiving antenna by means of an FFT or of a PLL.

In a particular embodiment, the first receiving antenna and the second receiving antenna of the receiving base are antennas each exhibiting a main radiation lobe of a width equal to or greater than 10°, preferably equal to or greater than 20°.

In a particular embodiment, the first receiving antenna and the second receiving antenna of the receiving base are horn antennas.

In a particular embodiment, the craft being a satellite in geostationary orbit, the first receiving antenna and the second receiving antenna are directed in such a way as to have, in their main radiation lobe, several satellites in geostationary orbit.

In a particular embodiment, the distance, between the transmitting antenna of the transmitter and at least one out of the first receiving antenna and the second receiving antenna, is less than the distance between said first receiving antenna and said second receiving antenna.

In a particular embodiment, the system comprises several transmitting antennas.

DESCRIPTION OF THE FIGURES

The invention will be better understood on reading the following description, given as a nonlimiting example, and with reference to the figures which represent.

In these figures, references that are the same from one figure to another designate identical or similar elements. For reasons of clarity, the elements represented are not to scale, unless otherwise stipulated.

DETAILED DESCRIPTION OF THE INVENTION

The present invention relates notably to a system 30 and a method 50 for estimating a path-length difference between two paths followed by a signal transmitted by a spacecraft or aircraft, referred to as "target signal", to arrive respectively on a first receiving antenna 32$a$ of a receiving base and a second receiving antenna 32$b$ of said receiving base.

Figure 1:
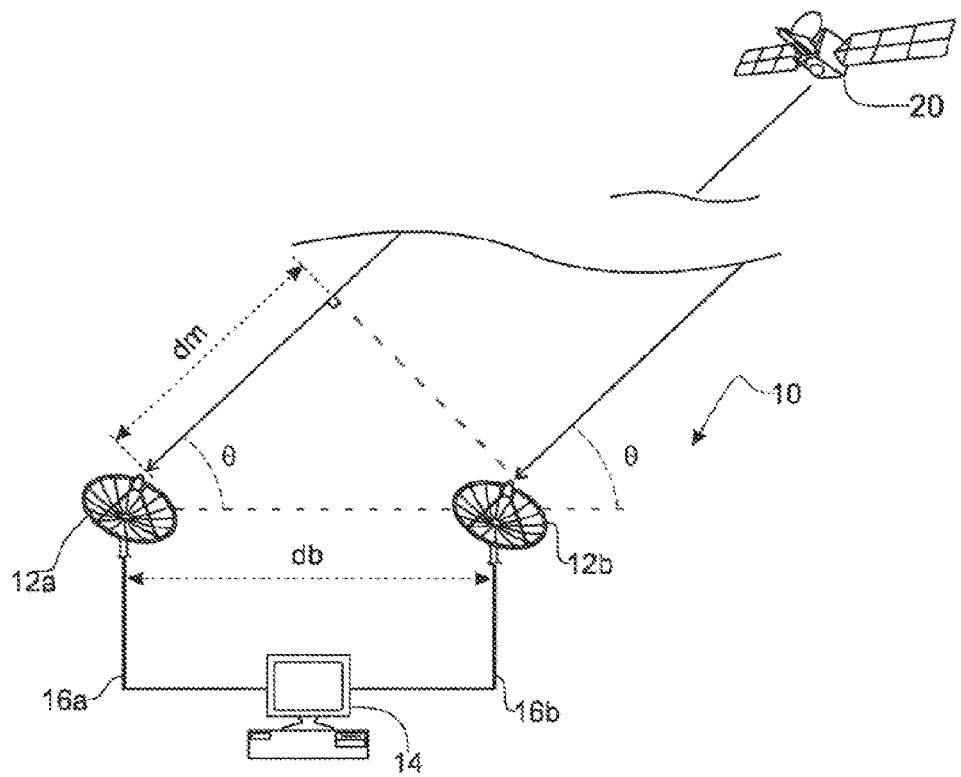
FIG. 1: already cited, a schematic representation of a GEO orbit recovery system according to the prior art.

Hereinafter in the description, the estimation of the path-length difference is performed by interferometry, the general principle of which described with reference to FIG. 1, is based on the determination of phase differences between signals corresponding to the target signal received by said first and second receiving antennas 32$a$, 32$b$.

Hereinafter in the description, the standpoint adopted, in a nonlimiting manner, is the case of a craft in earth orbit, and more particularly the case of a craft of satellite type in GEO orbit, the estimation system 30 being, for example, a subsystem of a GEO orbit recovery system.

Nothing precludes, according to other examples, from considering a satellite in traveling orbit such as a low earth orbit (LEO) or medium earth orbit (MEO), or even considering craft other than satellites, notably aircraft such as missiles, airplanes, drones, balloons, helicopters, satellite launchers, etc.

Figure 2:
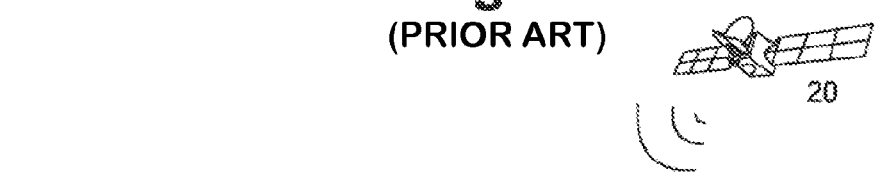
FIG. 2: a schematic representation of a signal path-length difference estimation system according to the invention.
Figure 2:
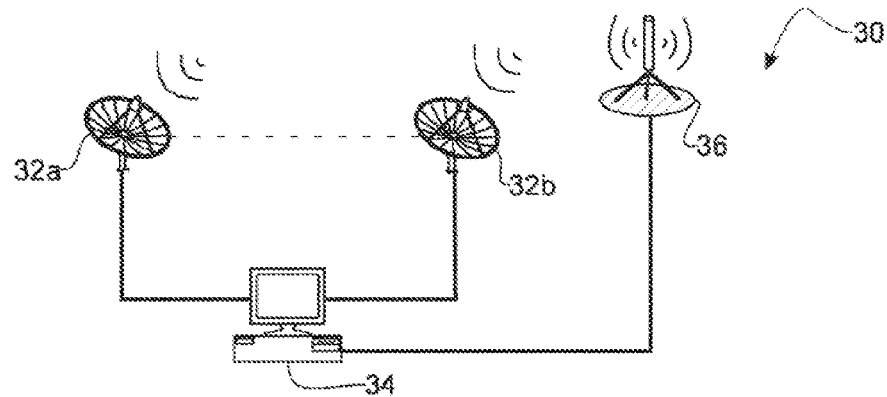

FIG. 2 schematically represents an exemplary path-length difference estimation system 30 according to the invention.

The receiving base of the estimation system 30 is situated substantially on the surface of the earth. "Substantially on the surface of the earth" should be understood to mean in particular on the ground, at the top of a building, at the top of a pylon, on a maritime platform, etc. As illustrated by FIG. 2, the first and second receiving antennas 32$a$, 32$b$ of the receiving base are, for example, parabolic antennas.

To estimate the path-length difference of a target signal transmitted by a satellite 20 in GEO orbit, the first and second receiving antennas 32a, 32b of the receiving base are preferably separated by a distance of between ten meters and one kilometer.

The estimation system 30 also comprises a processing device 34, linked to both the first receiving antenna 32a and the second receiving antenna 32b of the receiving base, suitable for processing the signals received by said first and second receiving antennas.

In a particular embodiment, illustrated by FIG. 2, the estimation system 30 comprises a transmitter, suitable for transmitting a signal, referred to as "calibration signal", to the receiving base. The transmitter comprises a calibration signal forming device and at least one transmitting antenna 36 situated substantially on the surface of the earth. In a particular embodiment of the estimation system 30, the transmitting antenna 36 and the first and second receiving antennas 32a, 32b are fixed to one another, that is to say that their phase centers are fixed relative to one another.

In the nonlimiting example illustrated by FIG. 2, the calibration signal forming device is the processing device 34 of the estimation system 30. Nothing precludes, according to other examples, from having a calibration signal forming device that is distinct from the processing device 34.

The processing device 34 comprises, for example, at least one processor and at least one electronic memory in which is stored a computer program product, in the form of a set of program code instructions to be executed to implement the different steps of the path-length difference estimation method 50 according to the invention. In a variant, the processing device 34 also comprises one or more programmable logic circuits, of FPGA, PLD and other such types, and/or custom integrated circuits (ASIC) suitable for implementing all or part of said steps of the estimation method 50.

In other words, the processing device 34 comprises a set of means configured by software (specific computer program product) and/or hardware (FPGA, PLD, ASIC, etc.) to implement the different steps of the estimation method 50 described hereinbelow.

Figure 3:
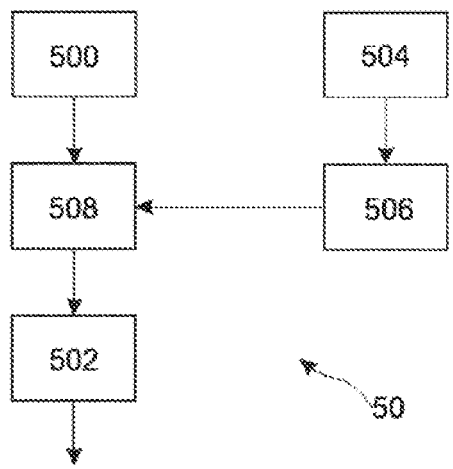
FIG. 3: a diagram schematically representing the main steps of a path-length difference estimation method according to the invention.

FIG. 3 represents the main steps of an exemplary implementation of a method 50 for estimating the path-length difference of a target signal transmitted by the satellite 20.

The estimation method 50 comprises the steps of:
- 500 measuring a phase difference, referred to as "useful phase difference", between two signals corresponding to the target signal: a first signal received by the first receiving antenna 32a and a second signal received by the second receiving antenna 32b,
- 502 estimating the path-length difference as a function of useful phase difference measurements.

It should be noted that the useful phase difference measurement can prove ambiguous when the distance between the first receiving antenna 32a and the second receiving antenna 32b is greater than the wavelength on which the target signal is transmitted.

As an example, for frequencies of the order of ten or so gigahertz (GHz), traditionally considered for communications by satellite in GEO orbit, the wavelength is of the order of from a few centimeters to a few tens of centimeters. It will be understood that, by considering a distance between the first receiving antenna 32a and the second receiving antenna 32b of between ten meters and one kilometer, the useful phase difference measurement may prove ambiguous.

This ambiguity may be eliminated by using other means, considered to be known to those skilled in the art, such as, in particular, by means of an a priori knowledge of certain parameters of the orbit of the satellite 20 (keplerian parameters of said orbit and its physical features: aerodynamic drag, solar radiation pressure coefficient, etc.). According to a nonlimiting example, the useful phase difference measurements are performed recurrently so as to obtain unambiguous measurements of the variation of the useful phase difference (by ensuring, based on a predefined knowledge of the maximum speed of variation of the path-length difference, that the maximum variation of the path-length difference between two successive measurements corresponds to a useful phase difference less than pi ($\pi$)). Such measurements of the variation of the useful phase difference can be used to estimate the variation of the path-length difference of the target signal transmitted by the satellite 20. Thus, the path-length difference at an instant t1 can be estimated provided that there is available an estimation of the path-length difference at an instant t0 (possibly supplied by other means) and an estimation of the variation of the path-length difference between the instants t0 and t1.

In the nonlimiting example illustrated by FIG. 3, the method 50 for estimating the path-length difference of the target signal also comprises the steps of:
- 504 transmitting a calibration signal to the first receiving antenna 32a and the second receiving antenna 32b of the receiving base,
- 506 measuring, by the processing device 34, a phase difference, referred to as "calibration phase difference", between two signals corresponding to the calibration signal: a first signal received by the first receiving antenna 32a and a second signal received by the second receiving antenna 32b,
- 508 compensating variations of the calibration phase difference measurements on the useful phase difference measurements.

The transmitting antenna 36 of the transmitter is essentially immobile relative to the receiving base, so it will be understood that the calibration phase difference variations will be mainly due to the phase instability of the receiving chains linking, on the one hand, the first receiving antenna 32a to the processing device 34 and, on the other hand, the second receiving antenna 32b to said processing device.

These phase instabilities, introduced by said receiving chains, are independent of the path-length difference of the target signal.

Thus, the calibration phase difference variations constitute an estimation of the phase instabilities of said receiving chains, and can therefore be used to compensate these phase instabilities on the useful phase difference measurements.

It will therefore be understood that, because of the transmission and the processing of the calibration signal, the phase instabilities, introduced by the receiving chains linking the first and second receiving antennas 32a, 32b to the processing device 34, will be able to be compensated by a suitable processing of the calibration phase difference measurements and the useful phase difference measurements.

Consequently, the design constraints on said receiving chains can be relaxed compared to the prior art. In particular, the phase stability of these receiving chains may be less than those of the prior art solutions since the possible phase instabilities can be compensated by virtue of the transmission and the processing of the calibration signal.

In a particular implementation, during the calibration phase difference measurement step 506, the processing device 34 performs a correlation of the signals received respectively on the first receiving antenna 32a and the second receiving antenna 32b by the transmitted calibration signal, and calculates the calibration phase difference as being the difference between the phases of the signals thus obtained by correlation.

In the case illustrated by FIG. 2 in which the processing device 34 also performs the forming of the calibration signal, said transmitted calibration signal is directly known to said processing device. When the calibration signal forming device is distinct from the processing device 34, the calibration signal is, for example, predefined for the estimation system 30, and a reference calibration signal is stored in an electronic memory of the processing device 34, said reference calibration signal being used for correlation with the signals received respectively on the first receiving antenna 32a and the second receiving antenna 32b of the receiving base.

"Correlation" should be understood to mean the complex product of a first signal by a second signal, said second signal being previously conjugated, followed by an average of said product over a sliding window. It should be noted that the correlation of the signals received by the calibration signal actually transmitted leads to an improvement in the signal to noise/interference ratio for the calibration phase difference measurements. In practice, the thermal noise is averaged over the duration of the sliding window (for example, the duration of the calibration signal), such that its power is reduced. Furthermore, the power of other signals, different from the calibration signal, such as the target signal or signals transmitted by interfering transmitters in the frequency band of said calibration signal, is also reduced if those signals exhibit a low correlation with the transmitted calibration signal.

Such an improvement in the signal to noise/interference ratio by correlation is hereinafter designated "processing gain".

It should be noted that nothing precludes, according to other examples not detailed hereinbelow, from performing the calibration phase difference measurement other than by correlation. In particular, when the calibration signal is a substantially sinusoidal signal (also known as "Continuous Wave", or CW), the processing device 34 can measure the phases of the signals received respectively on the first receiving antenna 32a and the second receiving antenna 32b using a PLL (Phase-Locked Loop), an FFT (Fast Fourier Transform), and so on, and calculate the difference between said duly measured phases.

The processing gain, hereinbefore described with reference to the correlation, exists regardless of the calibration phase difference measurement method used, provided that the latter implements integration of individual measurements.

Because of the processing gain, introduced for example by correlation, the signal to noise/interference ratio of the signals received before correlation, corresponding to the transmitted calibration signal, will be able to be low without prejudice to the calibration phase difference measurements. For example, the processing gain may make it possible to compensate a low antenna gain, for example because the calibration signal is received in secondary radiation lobes of the first and second receiving antennas 32a, 32b. Thus, the positioning constraints on the transmitting antenna 36 of the transmitter, in relation to the receiving base, will be relaxed by virtue of the processing gain.

It should be noted that the calibration signal is preferentially transmitted in one and the same frequency band as the target signal, or in a frequency band adjacent to that of the target signal. "Adjacent frequency bands" should be understood to mean that said frequency bands are separated by no more than 10 megahertz (MHz).

In practice, the phase instabilities, possibly introduced by the transmission paths linking the first and second receiving antennas 32a, 32b to the processing device 34 can depend on the frequency.

By transmitting the calibration signal in the frequency band of the target signal, or in an adjacent frequency band, said calibration signal will be subject roughly to the same phase instabilities as the target signal, such that the variations of the calibration phase difference measurements will be actually representative of the phase instabilities affecting the target signal.

However, the transmission of the calibration signal in a frequency band close to the frequency band used for the communications with the satellite 20 will generate interference. Such interference will be generated not only at the receiving base, but also on any terrestrial terminals and/or ground stations, located in proximity to the transmitter of the path-length difference estimation system 30, and communicating with the satellite 20 or with other satellites using the same frequency bands.

Because of the processing gain, introduced for example by correlation, the transmission power of the calibration signal by the transmitter will be able to be reduced, which offers the advantage of reducing interference, notably when the calibration signal is transmitted at the same time as the target signal. In particular, the calibration signal can then be transmitted continuously, which makes it possible to perform a continuous calibration of the variations linked to the phase instabilities of the first and second receiving chains 16a, 16b.

In a preferred embodiment of the estimation system 30, the transmitting antenna 36 of the transmitter is also situated in proximity to the receiving base. Such arrangements make it possible to further reduce the transmission power of the calibration signal, and consequently further reduce the dimensions of an area around the transmitting antenna 36 in which interference is likely to be generated. For example, the distance between the transmitting antenna 36 of the transmitter and at least one out of the first receiving antenna 32a and the second receiving antenna 32b, is less than the distance between said first receiving antenna 32a and said second receiving antenna 32b.

Different types of calibration signals can be implemented, making it possible to measure the calibration phase difference while minimizing the interference introduced on the target signal from which the effort is made to estimate the path-length difference between the paths between the satellite 20 and, respectively, the first receiving antenna 32a and the second receiving antenna 32b of the receiving base.

According to a first example, the calibration signal is a CW signal. Such a calibration signal offers the advantage of being simple to generate. Furthermore, such a calibration signal is simple to use inasmuch as it occupies a reduced frequency band, the center frequency of which can be chosen to be very close to the frequency band of the target signal considered.

According to another nonlimiting example, the calibration signal is a signal of the type with spread spectrum, for example a carrier frequency modulated by a predefined spectrum spreading code exhibiting good autocorrelation properties such as a pseudorandom sequence of PN (Pseudo-Random Noise), Gold, and other such types. Because of the spectrum spreading, the power spectral density of the calibration signal may be rendered arbitrarily low, the correlation by the spectrum spreading code introducing a processing gain that is all the greater as the spectrum spreading code length increases.

Such a calibration signal also makes it possible, by correlation of the signals received by the spectrum spreading code, to also determine the variations of difference in instants of reception of the calibration signal respectively on the first receiving antenna 32a and the second receiving antenna 32b of the receiving base, and/or the variations of difference of propagation time on the receiving chains between the first and second receiving antennas 32a, 32b and the processing device 34.

In a preferred implementation, the frequency band of the calibration signal is of a width greater than that of the target signal.

Such arrangements make it possible to resynchronize the signals received respectively on the first receiving antenna 32a and the second receiving antenna 32b. This proves particularly advantageous in the case where said signals received are digitized by asynchronous analog/digital converters, for example in proximity to said first and second receiving antennas 32a, 32b. The digital signals obtained after digitization can then be transmitted to the processing device 34 via a communication network of Ethernet or other such type. The digital signals are then resynchronized by the processing device 34 by correlation with the transmitted calibration signal.

Figure 4:
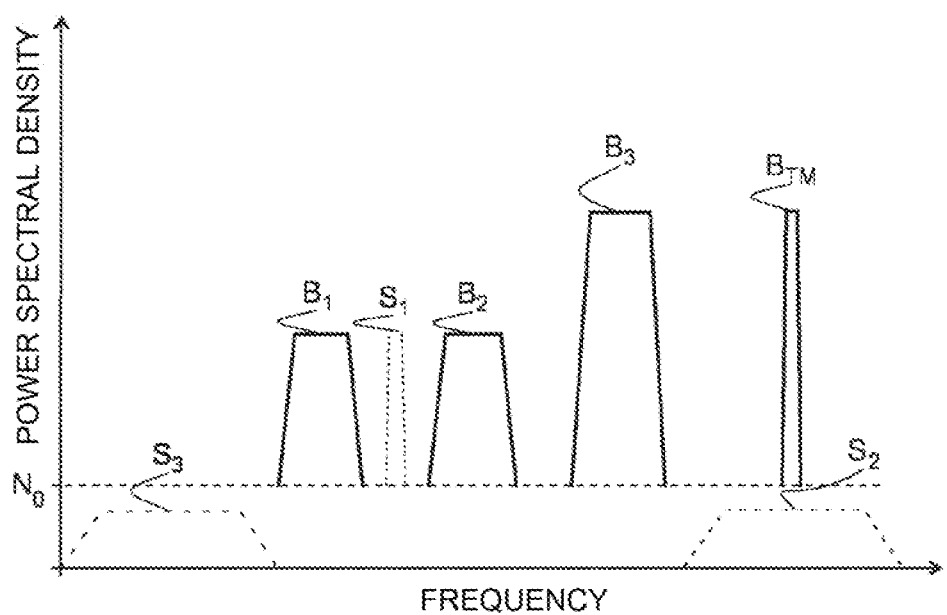
FIG. 4: a schematic representation of examples of calibration signals generating little interference with respect to signals transmitted by a satellite.

FIG. 4 schematically represents examples of frequency spectra of calibration signals generating little interference on the target signal transmitted by the satellite 20.

It should be noted that several types of target signal can be considered. According to a first example, the target signal is a predefined signal known a priori to the estimation system 30, such as a CW signal transmitted by the satellite 20 (for example, a CW signal transmitted to facilitate pointing of antennas substantially on the surface of the earth in the direction of said satellite, a carrier residue of a telemetry signal etc.).

According to another example, the target signal is a signal that is not known a priori, such as a payload signal (that is to say a signal corresponding to data received by the satellite 20 from a terrestrial terminal and/or from a ground station, and retransmitted toward the earth by said satellite, generally after frequency shifting and possibly after regeneration of the data received onboard said satellite).

FIG. 4 schematically represents several frequency spectra of signals transmitted by the satellite 20:
a frequency spectrum $B_{TM}$ of a telemetry signal;
three frequency spectra $B_1$, $B_2$ and $B_3$, wider than the frequency spectrum $B_{TM}$, each of said frequency spectra $B_1$, $B_2$ and $B_3$ corresponding to a payload signal of the satellite 20.

The frequency spectrum of the target signal transmitted by the satellite 20 can be any one of the frequency spectra $B_1$, $B_2$, $B_3$ and $B_{TM}$.

FIG. 4 also represents the frequency spectrum of the thermal noise, the power spectral density of which is, in the example represented, the same for all the frequencies, equal to a value designated $N_0$. The frequency spectra $B_1$, $B_2$, $B_3$ and $B_{TM}$ all exhibit a maximum power spectral density greater than $N_0$.

In FIG. 4, three examples of frequency spectra that are possible for the calibration signal are represented.

According to a first example, the calibration signal is a substantially sinusoidal signal, of frequency spectrum $S_1$. The frequency spectrum $S_1$ has a maximum power spectral density greater than $N_0$, is located between the frequency spectra $B_1$ and $B_2$ and does not exhibit any overlap with any of the frequency spectra $B_1$, $B_2$, $B_3$ and $B_{TM}$.

According to a second example, the calibration signal is a signal of the type with spread spectrum, of frequency spectrum $S_2$. The frequency spectrum $S_2$ exhibits an overlap with the frequency spectrum $B_{TM}$, but the maximum power spectral density of the frequency spectrum $S_2$ is less than $N_0$. The frequency spectrum $S_2$ does not exhibit any overlap with the frequency spectra $B_1$, $B_2$ and $B_3$.

According to a third example, the calibration signal is a signal of the type with spread spectrum, of frequency spectrum $S_3$. The frequency spectrum $S_3$ has a maximum power spectral density less than $N_0$ and does not exhibit any overlap with any of the frequency spectra $B_1$, $B_2$, $B_3$ and $B_{TM}$.

In practice, the reception of the payload signals requires, to extract the a priori unknown data included in said payload signals, the use of high gain receiving antennas and therefore highly directional receiving antennas directed toward the satellite from which said payload signals are sought to be received. In practice, a satellite in GEO orbit is located at a distance from the earth of approximately 36 000 kilometers, such that it proves necessary to have a high antenna gain in the direction of said satellite to allow for the extraction of the data included in said payload signals.

It should be noted that, if the first and second receiving antennas 32a, 32b are used only to estimate the path-length difference from a target signal transmitted by the satellite 20, the antennas do not necessarily need to be dimensioned to allow for the extraction of the data included in said payload signals. In such a case, the use of receiving antennas with low directivity is possible for estimating the path-length difference, especially since the phase instabilities, introduced by the receiving chains linking the first and second receiving antennas 32a, 32b to the processing device 34, are compensated by virtue of the transmission and the processing of the calibration signal. In the case of a satellite in GEO orbit, a receiving antenna can be considered to be not very directional when it exhibits a main radiation lobe with a width equal to or greater than 10°. In a preferred embodiment of the estimation system 30, the first receiving antenna 32a and the second receiving antenna 32b of the receiving base are antennas that each exhibit a main radiation lobe with a width equal to or greater than 20°, even equal to or greater than 30°.

For example, the first and second receiving antennas 32a, 32b are horn antennas. According to another example, the first and second receiving antennas are omnidirectional antennas.

The use of first and second receiving antennas 32a, 32b with low directivity, such as horn antennas, makes it possible to reduce the cost of manufacturing the estimation system 30.

Furthermore, because they are not very directional, such first and second receiving antennas can be directed in such a way as to have, in their main radiation lobe, several satellites in GEO orbit. Such an estimation system 30 can then be implemented, without having to change the orientation of said first and second receiving antennas 32a, 32b, to estimate the path-length differences for several satellites. Consequently, such an estimation system 30 is both inexpensive and makes it possible to recover the GEO orbits of several GEO satellites without having to repoint the first and second receiving antennas and, possibly, simultaneously for the different GEO satellites for which the GEO orbit is sought to be recovered.

Figure 5:
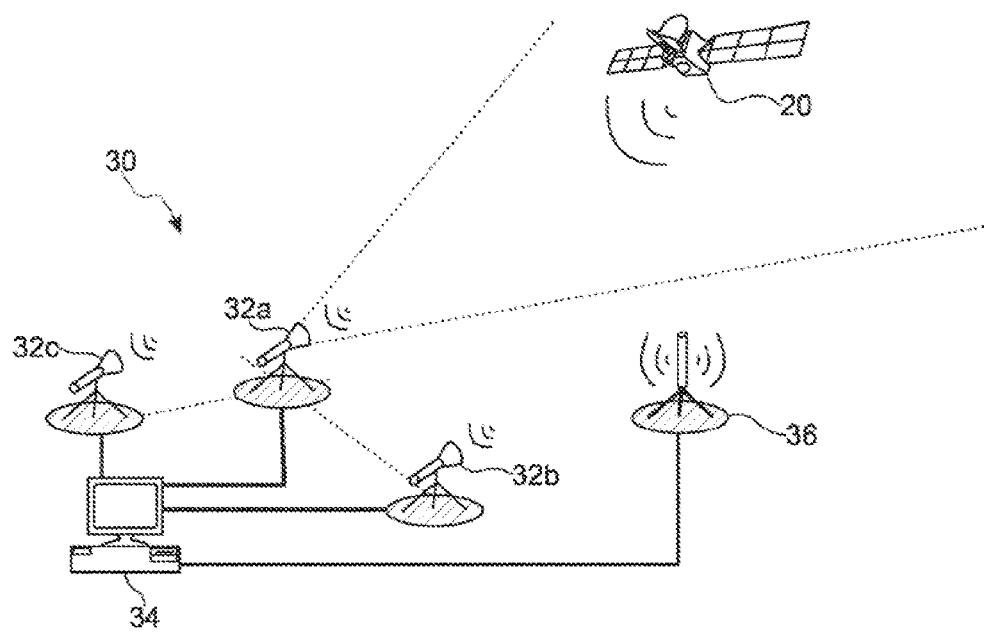
FIG. 5: a schematic representation of a preferred embodiment of a path-length difference estimation system according to the invention.

FIG. 5 represents a preferred embodiment of a system 30 for estimating the path-length difference of a target signal transmitted by a satellite 20.

In this example, the estimation system 30 comprises three receiving antennas: a first receiving antenna 32a, a second receiving antenna 32b and a third receiving antenna 32c.

The first, second and third receiving antennas 32a, 32b, 32c are horn antennas.

The first, second and third receiving antennas 32a, 32b, 32c are organized in at least two receiving bases:
a first receiving base formed by the first and second receiving antennas 32a, 32b;
a second receiving base formed by the first and third receiving antennas 32a, 32c.

Thus, the path-length difference of the target signal transmitted by the satellite 20 can be estimated with respect to each of the first and second receiving bases. Nothing precludes, according to other examples, from considering a third receiving base consisting of the second and third receiving antennas 32b, 32c.

In the example illustrated by FIG. 5, the estimation system 30 comprises a transmitting antenna 36 distinct from the receiving antennas 32a, 32b, 32c for transmitting the calibration signal. Nothing precludes, according to other examples not represented by figures, from using one of said receiving antennas for the transmission of said calibration signal. For example, the transmitting antenna is alternatively either the third receiving antenna 32c, or the second receiving antenna 32b. Thus, when the path-length difference is estimated relative to the first and second receiving antennas 32a, 32b of the first receiving base, the third receiving antenna 32c is used to transmit the calibration signal. When the path-length difference is estimated relative to the first and third receiving antennas 32a, 32c of the second receiving base, the second receiving antenna 32b is used to transmit the calibration signal.

It should however be noted that, the higher the frequencies considered, the more important it is to position the transmitting antenna 36 in a front half-plane of the receiving antennas 32a, 32b, 32c. Thus, the use of one of the receiving antennas 32a, 32b, 32c to transmit the calibration signal to the other two receiving antennas will be able to be considered for example in the VHF, UHF and even L or S frequency bands if the signal to noise/interference ratio is high. For the C, X, Ku, Ka, Q, V, etc. frequency bands, preference will be given to a transmitting antenna 36 distinct from the receiving antennas 32a, 32b, 32c, positioned in a front half-plane of said receiving antennas.

More generally, the scope of the present invention is not limited to the implementations and embodiments described above by way of nonlimiting examples, but, on the contrary, extends to all modifications within the scope of those skilled in the art.

For example, it has previously been considered that the phase centers of the transmitting antenna 36 and of the first and second receiving antennas 32a, 32b were fixed relative to one another. Such arrangements make it possible to consider that the variations of the calibration phase difference are essentially due to the phase instability of the receiving chains linking, on the one hand, the first receiving antenna 32a to the processing device 34 and, on the other hand, the second receiving antenna 32b to said processing device.

When the phase centers of the transmitting antenna 36 and of the first and second receiving antennas 32a, 32b are no longer fixed relative to one another, the modification of the relative positions of said phase centers leads to a phase variation which is added to the phase instability of the receiving chains, and which affects the useful phase differences and the calibration phase differences differently. This can occur in particular when the first and second receiving antennas 32a, 32b are mounted to be mobile in order to follow the movement of a satellite in geocentric orbit, when the wind on said first and second receiving antennas 32a, 32b makes a not-inconsiderable modification to the relative positions of said phase centers, etc. Such phase variations can nevertheless be compensated by other means.

According to a nonlimiting example, calibration tables are established beforehand that associate calibration phase differences with different sets of relative positions of said phase centers of the transmitting antenna 36 and of the first and second receiving antennas 32a, 32b. Then, the variation of the relative positions of said phase centers is determined, and the calibration tables make it possible to determine a calibration phase difference variation induced by the variation of said relative positions of said phase centers. This calibration phase difference variation, induced by a variation of the geometry of the estimation system 30, can then be compensated on the calibration phase difference measurements. After this compensation, the residual variations of the calibration phase difference measurements can be considered to be essentially induced by the phase instability of the receiving chains linking, on the one hand, the first receiving antenna 32a to the processing device 34 and, on the other hand, the second receiving antenna 32b to said processing device.

To determine the variation of the relative positions of said phase centers, the transmitting antenna 36 and the first and second receiving antennas 32a, 32b are, for example, equipped with position sensors for their phase centers, considered to be known to those skilled in the art. Alternatively, several transmitting antennas 36, considered to be fixed or else equipped with such position sensors, are used to determine the positions of the phase centers of the first and second receiving antennas 32a, 32b by triangulation.

The useful phase difference variation, induced by the variation of the geometry of the estimation system 30, is not specific to the invention and can be compensated by any means known to those skilled in the art.

More generally, it will also be understood that the invention is not limited to a particular number of receiving antennas, but on the contrary extends to any number Nb (Nb≥2) of receiving antennas.

Furthermore, the invention has been described by considering the estimation of a path-length difference, which can in turn be used to estimate the direction of arrival of the target signal. It will however be understood that the invention is applicable to any estimation of the direction of arrival of the target signal relative to the receiving base which would not include the path-length difference estimation but would nevertheless use useful phase difference measurements. According to a nonlimiting example, the direction of arrival of the target signal can be estimated by means of an algorithm of MUSIC type (see for example: "Multiple Emitter Location and Signal Parameter Estimation", R. O. Schmidt, IEEE Transactions on Antennas and Propagation, Vol. 34, No. 3, March 1986), the useful phase differences being compensated as described above by virtue of calibration phase difference measurements.

The above description clearly illustrates that, by its different features and their advantages, the present invention achieves the objectives that were set for it.

In particular, it will be understood that the estimation system 30 is simple and inexpensive to manufacture inasmuch as the constraints on the receiving chains are greatly relaxed by virtue of the transmission and the processing of the calibration signal. Furthermore, since the receiving antennas of the system 30 can be dimensioned for the path-length difference estimation, they do not have to be highly directional and can, for example, be horn antennas of lower directivity and smaller dimensions than the receiving antennas used in the estimation systems of the prior art.

The invention claimed is:

1. A method for estimating a path-length difference between two paths followed by a target signal transmitted by a spacecraft or aircraft respectively to a first receiving antenna and a second receiving antenna of a receiving base, the method comprising the steps of:

measuring a useful phase difference between signals corresponding to the target signal received respectively on the first receiving antenna and the second receiving antenna;

estimating the path-length difference as a function of the useful phase difference measurements;

transmitting a calibration signal to the receiving base via a transmitting antenna;

measuring a calibration phase difference between signals corresponding to the calibration signal received respectively on the first receiving antenna and the second receiving antenna;

compensating variations of the calibration phase difference measurements on the useful phase difference measurements; and measuring calibration phase difference comprising either a correlation of the signals received respectively on the first receiving antenna and the second receiving antenna with the transmitted calibration signal, or an analysis of the signals received respectively on the first receiving antenna and the second receiving antenna using a Fast Fourier Transform (FFT) or Phase-Locked Loop (PLL).

2. The method as claimed in claim 1, further comprising the step of transmitting the calibration signal and the target signal in at least partially overlapping respective frequency bands.

3. The method as claimed in claim 1, further comprising the step of transmitting the calibration signal at the same time as the target signal.

4. The method as claimed in claim 3, further comprising the step of transmitting the calibration signal continuously.

5. The method as claimed in claim 1, wherein the calibration signal is a substantially sinusoidal signal or a signal of a type with spectrum spread by a spectrum spreading code.

6. The method as claimed in claim 1, further comprising the steps of digitizing the signals received respectively on the first receiving antenna and the second receiving antenna by asynchronous analog/digital converters; transmitting the digitized signals to a processing device via a communication network, and re-synchronizing the digitized signal by the processing device by correlation with the transmitted calibration signal.

7. A non-transitory computer readable medium comprising computer executable code for estimating a path-length difference between two paths followed by a target signal transmitted by a spacecraft or aircraft respectively to a first receiving antenna and a second receiving antenna of a receiving base, the code programs a processing device to be configured to:

measure a useful phase difference between signals corresponding to the target signal received respectively on the first receiving antenna and the second receiving antenna;

estimate the path-length difference as a function of the useful phase difference measurements;

transmit a calibration signal to the receiving base via a transmitting antenna;

measure a calibration phase difference between signals corresponding to the calibration signal received respectively on the first receiving antenna and the second receiving antenna;

compensate variations of the calibration phase difference measurements on the useful phase difference measurements; and measure calibration phase difference comprising either a correlation of the signals received respectively on the first receiving antenna and the second receiving antenna with the transmitted calibration signal, or an analysis of the signals received respectively on the first receiving antenna and the second receiving antenna using a Fast Fourier Transform (FFT) or Phase-Locked Loop (PLL).

8. A system for estimating a path-length difference between two paths followed by a target signal transmitted by a spacecraft or aircraft respectively to a first receiving antenna and a second receiving antenna of a receiving base of the system, comprising:

a transmitter to transmit a calibration signal to the receiving base via a transmitting antenna; and a processing device configured to:

measure a useful phase difference between signals corresponding to the target signal received respectively on the first receiving antenna and the second receiving antenna;

estimate the path-length difference as a function of useful phase difference measurements;

measure a calibration phase difference between signals corresponding to the calibration signal received respectively on the first receiving antenna and the second receiving antenna by performing either a correlation of the signals received respectively on the first receiving antenna and the second receiving antenna with the transmitted calibration signal, or an analysis of the signals received respectively on the first receiving antenna and the second receiving antenna using a Fast Fourier Transform (FFT) or Phase-Locked Loop (PLL); and compensate variations of the calibration phase difference measurements on the useful phase difference measurements.

9. The system as claimed in claim 8, wherein the first receiving antenna and the second receiving antenna of the receiving base are antennas each exhibiting a main radiation lobe of a width equal to or greater than 10°.

10. The system as claimed in claim 8, wherein the first receiving antenna and the second receiving antenna of the receiving base are antennas each exhibiting a main radiation lobe of a width equal to or greater than 20°.

11. The system as claimed in claim 8, wherein the first receiving antenna and the second receiving antenna of the receiving base are horn antennas.

12. The system as claimed in claim 9, wherein the craft is a satellite in a geostationary orbit; and wherein the first receiving antenna and the second receiving antenna are directed to have, in their main radiation lobe, several satellites in the geostationary orbit.

13. The system as claimed in claim 8, wherein a distance, between the transmitting antenna of the transmitter and at least one of the first receiving antenna and the second receiving antenna, is less than a distance between the first receiving antenna and the second receiving antenna.

* * * * *